United States Patent [19]
Dietz

[11] 3,936,092
[45] Feb. 3, 1976

[54] SAFETY HARNESS
[75] Inventor: Gunter Dietz, Donberg, Germany
[73] Assignee: Gebr. Happich, GmbH, Germany
[22] Filed: Sept. 26, 1974
[21] Appl. No.: 509,323

Related U.S. Application Data
[63] Continuation-in-part of Ser. No. 416,079, Nov. 15, 1973, abandoned.

[30] Foreign Application Priority Data
Nov. 18, 1972 Germany............................ 2256650

[52] U.S. Cl. ............... 297/385; 24/205.17; 24/233; 244/122 B; 280/150 SB
[51] Int. Cl.² .......................................... A62B 35/00
[58] Field of Search ........................... 297/384–389; 280/150 SB; 24/205.17, 205.18, 230 A, 230 AP, 232 R, 233, 234, 235, 241 R, 241 P; 244/122 B, 122 R, 151 A

[56] References Cited
UNITED STATES PATENTS

| | | | |
|---|---|---|---|
| 718,948 | 1/1903 | Green | 297/385 X |
| 2,726,832 | 12/1955 | Gimalouski et al. | 244/151 A |
| 2,755,043 | 7/1956 | Holm et al. | 244/122 AA |
| 2,797,883 | 7/1957 | Martin et al. | 244/122 AH |
| 2,822,595 | 2/1958 | Ruhl | 24/230 AP |
| 3,032,848 | 5/1962 | Allen | 24/234 |
| 3,248,148 | 4/1966 | Board et al. | 297/388 |
| 3,316,017 | 4/1967 | Knight | 297/385 |
| 3,380,776 | 4/1968 | Dillender | 297/389 |
| 3,521,333 | 7/1970 | Dunster | 24/230 A |
| 3,524,679 | 8/1970 | DeLavenne | 297/384 |
| 3,579,750 | 5/1971 | Fallersleben | 24/230 A |
| 3,663,057 | 5/1972 | Lohr et al. | 297/388 |
| 3,774,870 | 11/1973 | Sheffield et al. | 244/122 B |

FOREIGN PATENTS OR APPLICATIONS
255,971   5/1963   Australia............................ 297/384

Primary Examiner—Roy D. Frazier
Assistant Examiner—William E. Lyddane
Attorney, Agent, or Firm—Ostrolenk, Faber, Gerb & Soffen

[57] ABSTRACT

Safety harness comprising a waistband to be wrapped around a person, shoulder suspenders projecting from the top of the waistband and means for coupling the waistband to a supportive body, such as an automobile; the coupling means comprises two separate belts joining opposite sides of the waistband to the supportive body; an openable coupling in each belt, which coupling includes a swivelable lock handle, which is adapted to be swiveled substantially simultaneously with the grasping and removal of the person from the supportive body; in additional embodiments, means connect the swivelable handles for both belt couplings so that swivel of one handle also swivels the other and releases the waistband.

15 Claims, 7 Drawing Figures

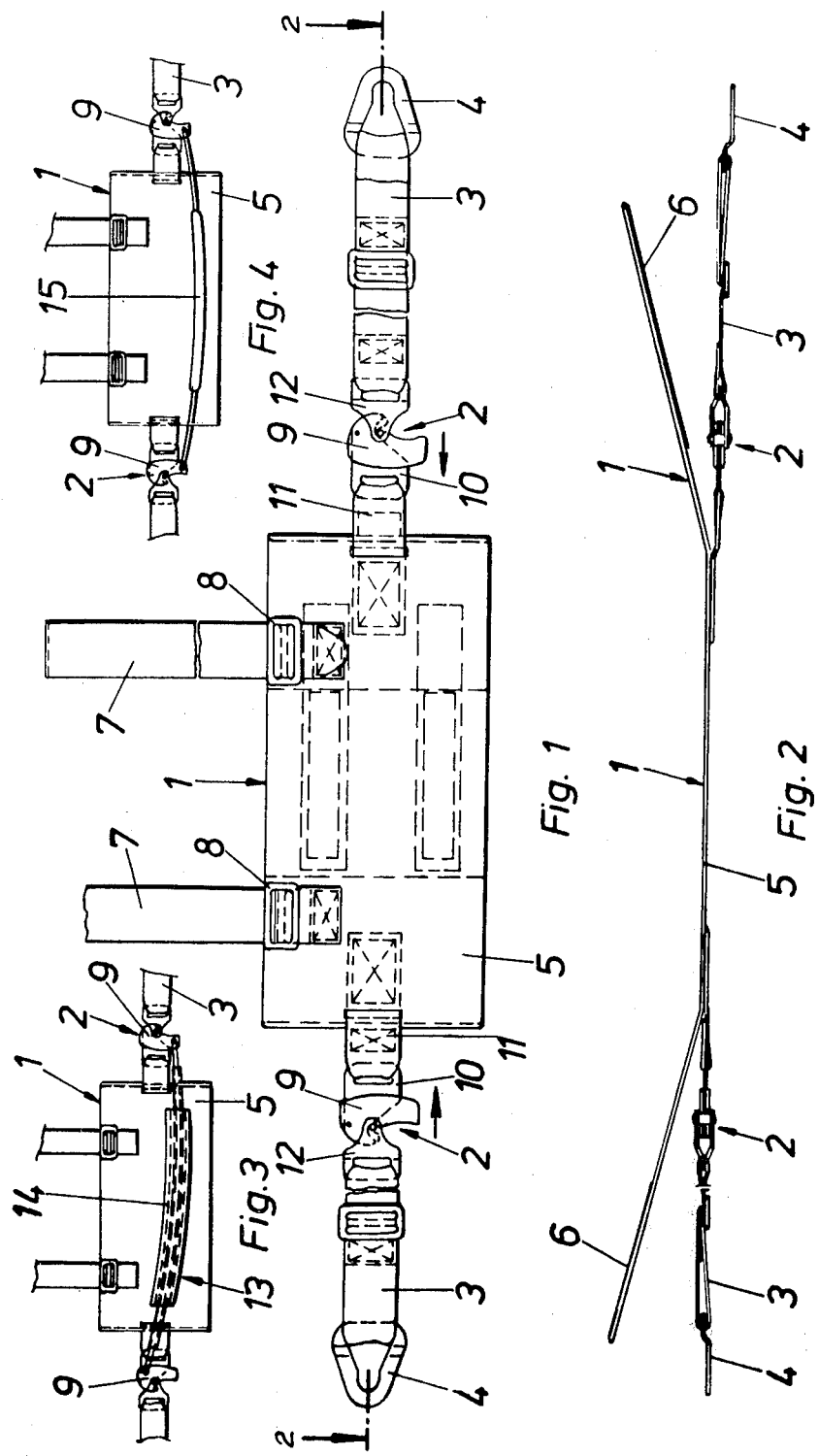

SAFETY HARNESS

This is a continuation-in-part of application Ser. No. 416,079, filed Nov. 15, 1973, now abandoned.

This invention concerns safety equipment particularly useful for children. In particular, it concerns a safety harness for use in automobiles, or the like. A harness holds the child's body and is removably coupled to the automobile body.

A variety of adult automobile safety belts have been developed. But belts designed for children have remained relatively unexplored. It was originally believed that adult safety belts could serve children when adjusted to a smaller scale. However, practical tests have shown that adult safety belts on the proper scale for children do not work.

The still supple body of a child is not adequately restrained by the preferred triangular or three point form safety belt. The belt easily slips over the child so that he loses the basic favorable position with respect to known safety belts and he may eventually become free of the safety belt. A safety belt generally cannot be tightened to the same extent with a child as with an adult. A child needs more freedom of movement than an adult, especially for longer automobile rides.

Furthermore, in most emergencies, adults who have not lost consciousness are able to release themselves from safety belts. This usually does not occur with small children and may not be possible with older children. A nearby adult must be able to free the belted child rapidly in an emergency and should preferably be able to seize, release from restraint and carry the child to safety, all with only one hand.

A child wearing a harness is in an upright sitting position. To some extent, he should have freedom of forward movement.

The invention solves the foregoing problems. To the body holding harness are attached fastening belts that are attached to the supportive body, such as an automobile. Each belt includes within itself a coupling means which can be easily coupled or uncoupled by a handle located in proximity to the harness. The separation of the holding belts from the harness enables removal of the child without impediment from belts or other remaining gear. The handles are arranged so that uncoupling of the coupling means is accomplished by a sideward movement of a hand in the direction of the instinctive movement of an adult seizing a belted child. This would save critical time in freeing the child, also without damaging the child or his clothing. The disengagement direction of the swivel handles is easily recognized by the adult who uses the invention. This is important because adults often may not have confidence that there will be the necessary quick release.

There is a further advantage when the handles are placed to face toward the lower side of the child's body below the harness. An adult would normally grasp a child below the safety harness and this is where the handles are.

As a further improvement, the swivel handles of the belt coupling means are tied together for simultaneous movement in the proper opening direction. Preferably, only a one hand movement should be required to release both belt coupling means at the same time. This is especially advantageous when the person seizing the child has only one hand free to do so, e.g. because the other arm is injured. The swivel handles can be tied together so that the user can release the child using either hand and operating either swivel handle.

With the invention, the child's body need not be held by a single thin width belt but may instead be held by a belt that is quite wide. This is accomplished by incorporating vest-type or wide waistband harnesses.

A still further improvement involves the vest or waistband portion having its forward facing side continuous and without breaks as it must be strong to absorb the emergency stop stresses, which might occur in an accident.

The vest or waistband has a closing means at its back part. This closing means should be constructed to enable selection of different lengths for the belt. This closing means should also be slipless when closed.

The application of the safety arrangements is simplified by using a differently colored waistband, shoulder harness and, possibly, fastening belts. This is particularly useful when similar types of belts are involved so that the different kinds of belts can be easily distinguished from each other. The manipulation of the safety equipment is greatly simplified.

Embodiments of the invention are shown in the drawings.

FIG. 1 is a front view of a safety arrangement for children in accordance with the invention;

FIG. 2 is a top view of the arrangement of FIG. 1, with the body belt open;

Figure 5:
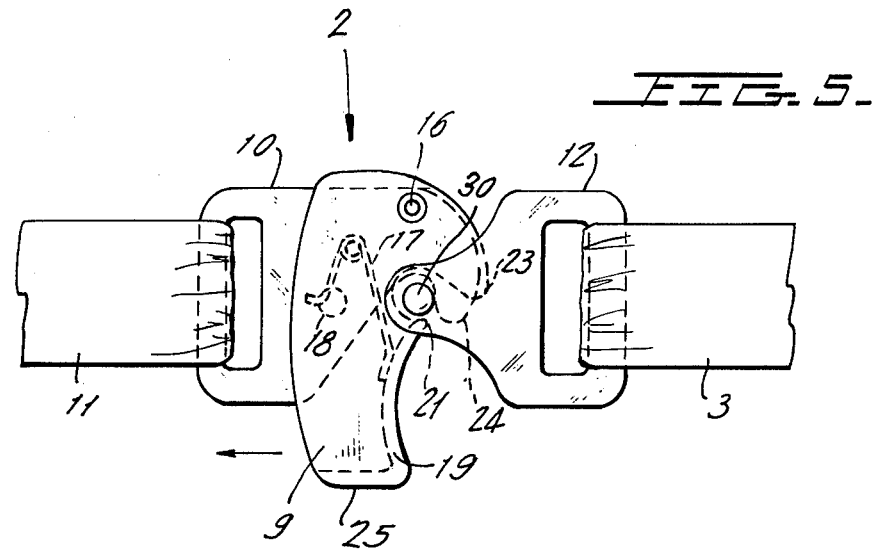
Figure 6:
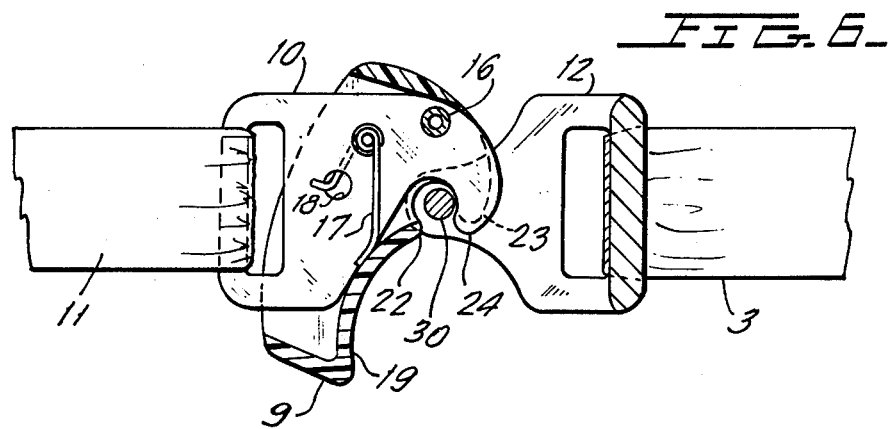

FIGS. 3 and 4 each show a fragment of the front view of respective further design of the safety arrangement;

FIG. 5 is an elevational view of a swivel handle of the belt in the belt locked condition;

FIG. 6 shows the handle swiveled to the unlocked condition; and

Figure 7:
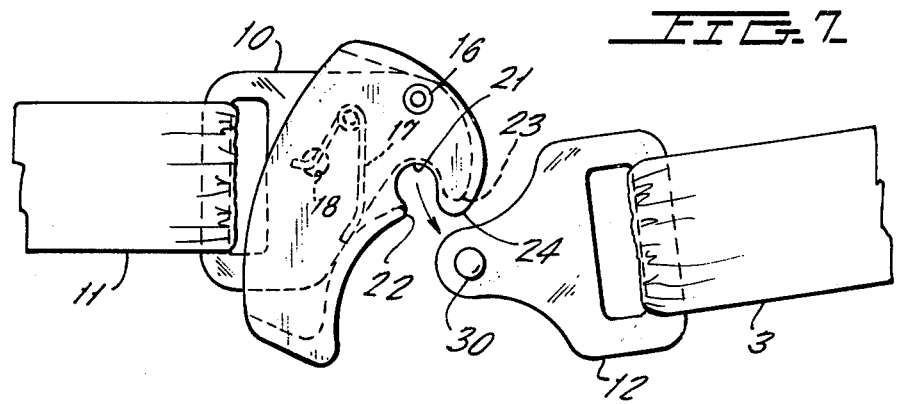

FIG. 7 shows the waistband uncoupled from the belt.

Turning to the drawings, FIG. 1 shows a vest-type safety arrangement having attached to each side of the waistband or vest a coupling means 2. Greater detail of means 2 is shown in FIGS. 5–7. Through coupling means 2 the waistband is attached to belt 3. End 4 of belt 3 is attached (by means not shown) to an automobile (not shown). The vest type portion 1 is comprised of a waistband 5 which has substantial height, as viewed in FIG. 1, as compared to other safety arrangements. Waistband 5 has a vest like character. Waistband 5 can encircle and be closed around the body of the child. The waistband extends in front of the child and fastens behind him. The free ends of the waistband may be held by a flat zipper. Alternatively, the free end portions of waistband 5, as shown in FIG. 2, are provided with waistband fastening means, like engageable fastening surfaces 6. One example of fastening means is a non-slip, flat material surface lock. This might, for instance, be the hook and loop surface lock identified as Velcro, or it might be adhesive surfaces. It is a matter of choice as to which end or surface 6 carries the one of the fastening surfaces and which carries the other. A flat grappler lock is quite easily and rapidly closed and opened. Also, flat engaging panels 6 enable the length of waistband 5 to be adjusted with ease for different size children and different degrees of tightness. The locking force of the flat grappling lock is sufficient under both ordinary and extreme conditions. Also, ease and efficiency of use in waistband 5 is assured.

Two shoulder straps 7 are attached to waistband 5. Straps 7 are illustrated as being parallel and as not crossing each other. The lengths of shoulder straps 7 are adjustable by their buckles 8, so that the location of waistband 5 can be chosen to best accommodate the size of the child.

Waistband 5 is attached to the automobile by holding belts 3 and 11 and by intermediate coupling means 2, which is illustrated as being a hook coupling. The hook coupling is comprised of one coupling means element, a latching element, which is comprised of a double armed swivel handle 9 which is pivotally attached at 16 to support plate 10, which is, in turn, attached to fastening belt 11 secured to waistband 5. The hook closure of handle 9 would have a safety catch (not shown), e.g. a transverse bolt that is passed through one of the cooperating elements of the swivel handle when the coupling means 2 is closed. The bolt is carried by a ring and is supported by holding belt 3.

It is significant that the hook closures are openable from the underside of the harness and that the coupling means 2 are near waistband 5. It is thus possible with a minimal number of movements to grasp the child and simultaneously release coupling means 2. Swivel handle 9 is pivotally mounted at pivot connection 16 to its support plate 10. Pivot connection 16 is oriented to enable handle 9 to swivel in a plane generally parallel to the plane of belt 3 between its upper and lower edges and at the position of swivel 16 along belt 3. As viewed in the drawing, handle 9 can pivot clockwise and counterclockwise about its pivot. Leaf spring 17 engages at one end in opening 18 in plate 10 and at the opposite end against abutment 19 on handle 9 and the spring normally biases handle 9 counterclockwise toward its position of FIG. 5.

Handle 9 includes a locking slot 21 extending in from a side edge. The slot has a lower lip 22 and an upper lip 23. Plate 10 is shaped to define depending tab 24. As shown in FIG. 5, tab 24 cooperates with lower lip 22 to hold below described pin 30 in slot 21.

To be coupled to plate section 10 is the belt coupling part 12 which carries projecting from it the other coupling means element, the latch element comprised of coupling pin 30. In the start position illustrated in FIG. 5, pin 30 is in slot 21 and is held therein by lower lip 22 and plate tab 24.

Turning to FIG. 6, as handle 9 is pivoted clockwise, its upper lip 23 moves to align with tab 24, and its lower lip 22 moves out of the way of pin 30. Now pin 30 can slip out of slot 21. Such motion of handle 9 is accomplished by manually contacting handle 9 at its bottom section 25 and pressing it clockwise.

Once the pin 30 is able to be freed from the slot 21, the center waistband portion of the belt is free and the person wearing the waistband can be freely lifted away from the remaining portion of the belt without any interference.

Normally, one grasps a child using both hands applied to the child's sides below the waistband. In moving to grasp the child (in the directions of the arrows in FIG. 1), the upper edges of the grasper's hands engage the double armed swivel handle 9. This natural hand movement opens the hooking mechanism, handle 9 swivels free of coupling part 12 of belt 11 (FIG. 6), and the belt falls away (FIG. 7). Holding belt 3 is released from the waistband. The simultaneous grasping of the child and releasing of the coupling is particularly important in case of an emergency, so that the child can be rapidly taken out of the automobile.

As shown in FIG. 2, fastening belt 3, coupling arrangement 2 and the forward part of waistband 5 form one unit, even though the elements can be released. The entire system is so strongly built that even large and/or bouncing children can be securely held.

In the arrangement of FIGS. 1 and 2, both hands are required to release coupling arrangements 2 and waistband 5. With the below described safety arrangements of FIGS. 3 and 4, the child can be freed and brought out of the automobile to safety by a rescuer using only one hand. This is desirable especially when the person seizing the child has only one hand available, e.g. because the other hand is hurt or is needed for supporting oneself.

In the embodiment of FIG. 3, the double armed swivel handles 9 are connected together by a linking means so that both locks are released when only one handle is engaged. One end of a Bowden type, or a relatively rigid or a motion transmitting wire 13 is attached to the under part of one double armed swivel handle 9 at one side of the arrangement. The other end of the wire is attached to the upper part of the other double armed swivel handle 9. The wire serves as the main feature of the linking means. When either swivel handle 9 is moved to open the closing mechanism, this automatically releases the other swivel handle 9. The casing of this Bowden type wire 13 is attached to waistband 5 by a long constructed loop 14.

FIG. 4 shows a further variation of the safety arrangement of FIG. 3. Both swivel handles 9 are connected on their under sides by a linking means, comprising tie line 15, which runs lengthwise over waistband 5. Tie line 15 may be completely free or be removably attached to waistband 5. To open the locking mechanism, tie-line 15 might be pulled upon across its direction of extension. This pulls on both handles 9 and tie-line 15 moves both handles 9 in the opening direction.

Although the present invention has been described in connection with preferred embodiments thereof, many variations and modifications will now become apparent to those skilled in the art. It is preferred, therefore, that the present invention be limited not by the specific disclosure herein, but only by the appended claims.

I claim:

1. A safety harness arrangement for restraining a person, comprising:
   a waistband to be secured to the person to be restrained; said waistband having a forward portion in front of the person and having sides at the sides of said forward portion;
   at least one belt connected to one said waistband sides for joining said waistband to a support, said belt has a top edge and a bottom edge when said belt is attached to said waistband;
   coupling means in said belt, said coupling means being separable to separate said waistband from said belt; said coupling means comprising a first coupling element connected to said waistband and a second coupling element connected to the separable part of said belt; one of said first and second coupling elements comprising a latching means and the other of said first and second coupling elements comprising a latch element that is to be latched onto by said latching means and that is to be released from latching by said latching means;
   said latching means including a mechanism for engaging said latch element; a handle connected to said latching means mechanism; said handle being swivelingly connected to a swivel on the one of said belt and said waistband to which said handle is connected;

said latching means mechanism, said latch element and said handle being so shaped and located that upon swiveling of said handle in the direction toward said waistband, said latching means is uncoupled from latch element, said handle and its said swivel being oriented and adapted to enable said handle to swivel in a plane generally parallel to the plane joining said belt top and bottom edges at the position of said swivel along said belt; said handle projecting beyond one of said edges of said belt, such that contact with said handle beyond that said one edge of said belt by motion in the direction toward said waistband swivels said handle to open said latching means.

2. The safety harness arrangement of claim 1, wherein said handle projects below said belt bottom edge.

3. The safety harness arrangement of claim 2, wherein said latch element comprises a post and said latching means mechanism is adapted to engage said post in a manner that precludes separation of said belt from said waistband, and is adapted to be uncoupled from said post by swiveling of said handle.

4. The safety harness arrangement of claim 3, wherein said post is said first coupling element and said latching means is said second coupling element.

5. The safety harness arrangement of claim 1, wherein there are at least two said belts, one said belt being fastened to one of said sides of said waistband and the other said belt being fastened to the other of said sides of said waistband; a respective said coupling means in each said belt.

6. The safety harness of claim 5, further comprising means linking said handles of said coupling means to shift together such that swiveling movement of one said handle toward said waistband causes simultaneous swiveling movement of the other said handle toward said waistband.

7. The safety harness of claim 6, wherein said linking means comprises a tie connected to and extending between the side of one said handle above its respective said swivel with the side of the other said handle below its respective said swivel, such that swiveling of one said handle through said tie swivels the other said handle.

8. The safety harness of claim 6, wherein said linking means comprises a tie connected to and extending between the same side of each said handle with respect to their respective said swivels, such that pulling said tie swivels both said handles toward said waistband.

9. The safety harness of claim 5, wherein said waistband is of sufficient length to wrap about the person wearing it and is adjustable in length.

10. The safety harness of claim 9, wherein said waistband has substantially greater height along the body of the wearer than said belts thereby to provide a supporting vest for the wearer.

11. The safety harness of claim 9, wherein said waistband forward portion is positioned in front of the person wearing it and is between said belts; said waistband forward portion and said belts with their said coupling means comprises a single normally unitary separable unit.

12. The safety harness of claim 9, wherein said waistband is defined by a length of material having end portions which are brought together when said waistband is wrapped about a wearer; at said end portions are fastening means for holding said waistband closed around the wearer.

13. The safety harness of claim 12, wherein said waistband fastening means are adjustable to permit adjustment of the length of said waistband.

14. The safety harness of claim 13, wherein said fastening means comprise a slipless flat locking mechanism comprised of panels with joinable surfaces, with one said surface on each said end portion.

15. The safety harness arrangement of claim 1, wherein said latching means mechanism comprises a latching element engaging tab; said handle having a lip facing away from said waistband for engaging said latching element and said lip and said tab being so positioned that said latching element is held between them; said handle lip being so placed with respect to said swivel that upon swiveling of said handle toward said waistband said lip moves away from and thereby releases said latching element.

* * * * *